United States Patent
Riffle et al.

(10) Patent No.: US 9,429,059 B2
(45) Date of Patent: Aug. 30, 2016

(54) ENHANCED REAL-TIME AMMONIA SLIP DETECTION

(71) Applicant: Ford Global Technologies, LLC, Dearborn, MI (US)

(72) Inventors: Chris Riffle, Brighton, MI (US); Frank M. Korpics, Belleville, MI (US); Michiel J. Van Nieuwstadt, Ann Arbor, MI (US); Devesh Upadhyay, Canton, MI (US); David Robert Nader, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 13/859,435

(22) Filed: Apr. 9, 2013

(65) Prior Publication Data

US 2014/0298778 A1 Oct. 9, 2014

(51) Int. Cl.
*F01N 3/20* (2006.01)
*B01D 53/94* (2006.01)

(52) U.S. Cl.
CPC ............ *F01N 3/208* (2013.01); *B01D 53/9409* (2013.01); *B01D 53/9495* (2013.01); *B01D 2251/2062* (2013.01); *F01N 2560/026* (2013.01); *F01N 2610/02* (2013.01); *F01N 2900/0421* (2013.01); *F01N 2900/1402* (2013.01); *F01N 2900/1616* (2013.01); *Y02T 10/24* (2013.01)

(58) Field of Classification Search
CPC ............ F01N 3/208; F01N 2560/026; F02D 41/146–41/1465
See application file for complete search history.

(56) References Cited

U.S. PATENT DOCUMENTS

| | | | |
|---|---|---|---|
| 2011/0185707 A1* | 8/2011 | Upadhyay | F01N 3/18 60/274 |
| 2012/0017568 A1* | 1/2012 | Geveci et al. | 60/274 |
| 2012/0085083 A1 | 4/2012 | Zayan | |

OTHER PUBLICATIONS

Riffle, Chris et al., "Methods and Systems for Ammonia Slip Detection," U.S. Appl. No. 13/650,967, filed Oct. 12, 2012, 31 pages.

* cited by examiner

*Primary Examiner* — Jonathan Matthias
(74) *Attorney, Agent, or Firm* — Julia Voutyras; Alleman Hall McCoy Russell & Tuttle LLP

(57) ABSTRACT

Various systems and methods are described for detecting ammonia slip. In one example method, an exhaust system with two NOx sensors uses transient responses of the NOx sensors to allocate tailpipe NOx sensor output to NOx and $NH_3$ levels therein. An ammonia slip detection counter with gains is included that determines a probability of NOx and $NH_3$ based on the measured sensor activities that are further processed by a controller to adjust one or more parameters based on the allocation and changes of sensor output.

16 Claims, 4 Drawing Sheets

ENHANCED REAL-TIME AMMONIA SLIP DETECTION

FIELD

The present application relates generally to ammonia slip detection in an exhaust gas treatment system included in an exhaust system of an internal combustion engine.

BACKGROUND AND SUMMARY

Diesel vehicles may be equipped with an exhaust gas treatment system which may include, for example, a urea based selective catalytic reduction (SCR) system and one or more exhaust gas sensors such as nitrogen oxide ($NO_x$) sensors, at least one of which may be disposed downstream of the SCR system. When the SCR system becomes loaded with urea to a point of saturation, which varies with temperature, the SCR system may begin to slip ammonia ($NH_3$). The $NH_3$ slip from the SCR system may be detected by the tailpipe $NO_x$ sensor as $NO_x$ resulting in an inaccurate $NO_x$ output which is too high. As such, the efficiency of the SCR system may actually be higher than the efficiency determined based on the inaccurate NOx output.

US 2012/0085083 describes a method for estimating NOx conversion using a polynomial model that also allows for the $NH_3$ concentration at the downstream tailpipe NOx sensor to be estimated. As described therein, temporal sensor signatures of a feedgas NOx sensor located upstream of the SCR and a tailpipe NOx sensor located downstream of the SCR are quantified and fit using a polynomial model that enables estimation of $NH_3$ slip and NOx conversion efficiency. However, because the method uses a segment of each sensor signal for processing, a time lag exists between the acquisition of each NOx sensor output signal and the allocation of downstream NOx sensor output to NOx and $NH_3$. When the time lag is combined with the polynomial fitting algorithm described, which may be prone to localized estimation errors, realization of a real-time $NH_3$ slip detection system by the methods described would be difficult to implement.

The inventors have recognized disadvantages with the approach above and herein disclose methods for the real-time control of ammonia slip in an engine exhaust system. Methods described use transient responses of a NOx sensor to identify the rates of change of a NOx signal. Then, a processor further uses the rates of change to determine how the downstream tailpipe NOx sensor is expected to change based on the flow upstream of the SCR, which allows allocation of a tailpipe NOx sensor in the manner described below with substantially no perceivable delays in processing.

In one particular example, the exhaust system includes two NOx sensors that continuously monitor the exhaust gas flow upstream and downstream of an SCR device. Then, when entry conditions of the engine system are met, for example when the SCR device is above a temperature threshold, the rate of change of the upstream feedgas NOx sensor is combined with a current tailpipe reading to estimate the rate of change of the tailpipe NOx sensor expected based on the feedgas signal slope. The expected tailpipe NOx signal is then compared with the actual NOx signal in order to allocate the NOx sensor output to NOx and $NH_3$.

In another example, a method is provided that comprises allocating a NOx sensor output to each of $NH_3$ and NOx based on an upstream NOx rate of change and a downstream NOx rate of change relative to the SCR emission device, which thereby allows the amount of reductant delivered to the engine exhaust to be adjusted based on the relative sensor signals. Because the method uses transient responses of the upstream and downstream NOx sensors, in addition to the expected NOx signal, it is therefore possible to achieve a high level of $NH_3$ detection. In this way, it is possible to provide enhanced allocation of the NOx sensor output in order to determine the relative NOx and $NH_3$ levels in the exhaust system.

The present description may provide several advantages. In particular, the approach may allow for the real-time detection of $NH_3$ slip with a high level of detection sensitivity without high feedgas NOx interventions. Thus, $NH_3$ slip can be detected while a vehicle is in operation and corrective measures taken based on the current state of the exhaust system. Furthermore, because the detection sensitivity is increased, high levels of NOx are not required in order to determine the allocation of the tailpipe NOx sensor output to NOx and $NH_3$.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The following description relates to methods and systems for detecting $NH_3$ slip from an SCR system based on transient NOx signals detected therein. In one example, a method comprising using information from two NOx sensors, a feedgas sensor located upstream of the SCR and a tailpipe sensor located downstream, to predict a tailpipe NOx slope responsive to the transient feedgas NOx signal is described. The method further comprises generating an envelope around the expected tailpipe NOx signal and allocating output from the NOx sensor to each of ammonia and nitrogen oxide in different amounts depending on changes in sensor output. For example, a transient tailpipe sensor output that falls outside of an expected envelope indicates an exhaust system that is slipping $NH_3$, which is further quantified by ramping a counter positive toward an upper level that indicates $NH_3$ slip. Conversely, a transient tailpipe sensor output falling within the expected envelope indicates NOx slip, which is further quantified by ramping a counter negative toward a lower level that indicates NOx slip. In this manner, the exhaust gas sensor may be used to indicate both a reduced exhaust gas treatment system efficiency and an $NH_3$ slip condition. The method further comprises adjusting one or more operating parameters based on the allocation and change in sensor output.

Figure 1:
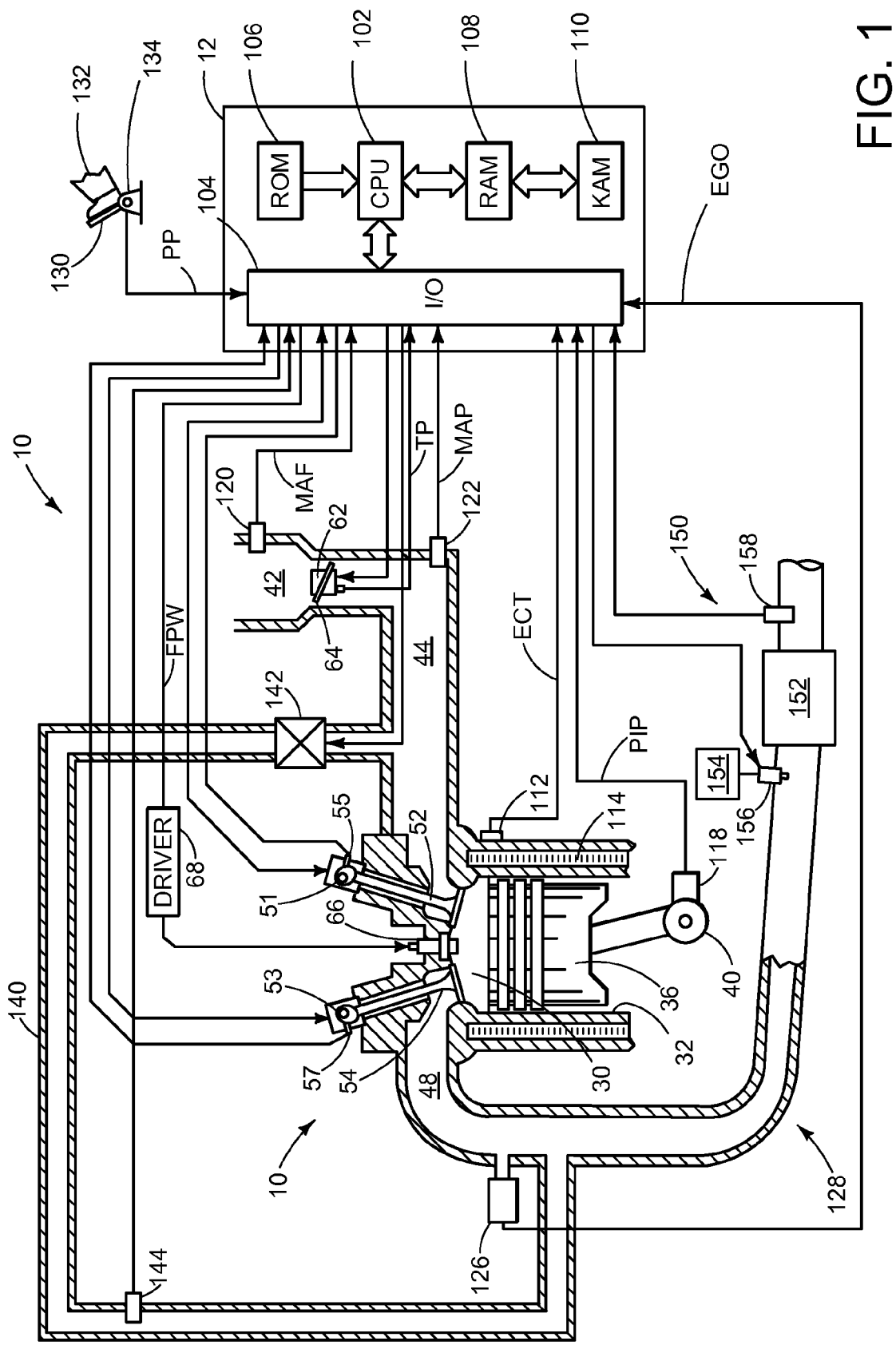
FIG. 1 shows a schematic diagram of an engine including an exhaust system with an exhaust gas treatment system.

Referring now to FIG. 1, a schematic diagram showing one cylinder of multi-cylinder engine 10, which may be included in a propulsion system of an automobile, is illustrated. The engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (or cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 12 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 48 to the intake passage 42 via an EGR passage 140. The amount of EGR provided to the intake manifold 44 may be varied by a controller 12 via an EGR valve 142. By introducing exhaust gas to the engine, the amount of available oxygen for combustion is decreased, thereby reducing combustion flame temperatures and reducing the formation of $NO_x$ for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust passage 48 upstream of an exhaust gas treatment system 150. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust gas treatment system 150 is shown arranged along the exhaust passage 48 downstream of the exhaust gas sensor 126.

In the example shown in FIG. 1, the exhaust gas treatment system 150 is a urea based selective catalytic reduction (SCR) system. The SCR system includes at least an SCR catalyst 152, a urea storage reservoir 154, and a urea injector 156, for example. In other embodiments, the exhaust gas treatment system 150 may additionally or alternatively include other components, such as a particulate filter, lean $NO_x$ trap, three way catalyst, various other emission control devices, or combinations thereof. In the depicted example, the urea injector 156 provides urea from the urea storage reservoir 154. However, various alternative approaches may be used, such as solid urea pellets that generate an ammonia vapor, which is then injected or metered to the SCR catalyst 152. In still another example, a lean $NO_x$ trap may be positioned upstream of SCR catalyst 152 to generate $NH_3$ for the SCR catalyst 152, depending on the degree or richness of the air-fuel ratio fed to the lean $NO_x$ trap.

The exhaust gas treatment system 150 further includes an exhaust gas sensor 158 positioned downstream of the SCR catalyst 152. In the depicted embodiment, the exhaust gas sensor 158 may be a $NO_x$ sensor, for example, for measuring an amount of post-SCR $NO_x$. In some examples, an efficiency of the SCR system may be determined based on the exhaust gas sensor 158, for example, and further based on the exhaust gas sensor 126 (when the sensor 126 measures $NO_x$, for example) positioned upstream of the SCR system. In other examples, the exhaust gas sensor 158 may be any suitable sensor for determining an exhaust gas constituent concentration, such as a UEGO, EGO, HEGO, HC, CO sensor, etc.

The controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126 and 158. Engine speed signal, RPM, may be generated by controller 12 from signal PIP.

The storage medium read-only memory 106 can be programmed with non-transitory, computer readable data representing instructions executable by the processor 102 for performing the methods described below as well as other variants that are anticipated but not specifically listed.

In one example, the controller 12 may detect $NH_3$ slip based on output from the exhaust gas sensor 158, as will be described in greater detail below with reference to FIG. 2. As an example, when the sensor 158 detects a threshold increase in $NO_x$ output, the controller 12 adjusts the EGR valve 142 to reduce an amount of EGR such that $NO_x$ emission from the engine 10 increases. Based on the change in sensor output during the period of reduced EGR, the sensor output is allocated to $NO_x$ or $NH_3$. For example, if the sensor output increases, the output is allocated to $NO_x$, as increased $NO_x$ from the engine is not reduced by the SCR system. On the other hand, if the sensor output does not change by more than a threshold amount, the output is allocated to $NH_3$ and $NH_3$ slip is indicated. Based on the change in output and the allocation, the controller 12 may adjust one or more engine operating parameters. As non-limiting examples, the controller 12 may adjust the amount of EGR and/or the delivery of reductant based on the change in output and the allocation.

As described above, FIG. 1 shows one cylinder of a multi-cylinder engine, and each cylinder may similarly include its own set of intake/exhaust valves, fuel injector, spark plug, etc.

Turning to the plots shown in FIGS. 2A-D, an example transient NOx signal depicts an ammonia slip condition is shown for the two sensor system of FIG. 1. Because NOx sensors produce output signals responsive to both NOx and $NH_3$, a method to detect $NH_3$ slip may be useful for managing the output of the exhaust system and resources therein. For example, if an SCR system is loaded with urea to the point of saturation, which varies with temperature, it may start to slip $NH_3$. The $NH_3$ slipping past the SCR may be read by the tailpipe NOx sensor as NOx, which confuses the SCR control and monitoring system into thinking the system has a lower efficiency than it really has since some of the signal is actually due to $NH_3$.

In FIGS. 2A-D, four temporal plots are shown that exemplify the method. The four plots are related and therefore use the same time axis, which for simplicity is shown along the bottom plot. Furthermore, although the data is shown schematically as a function of time in seconds, the unit of time is not limiting and other units of time are possible. From top to bottom, the four plots represent: NOx signals collected by NOx sensors in the exhaust gas system; derivative plots of the predicted and actual slopes of the tailpipe NOx sensor according to the method; a plot showing the difference between predicted and actual slopes of the tailpipe NOx sensor; and a counter with a threshold to indicate $NH_3$ slip.

Figure 2A:
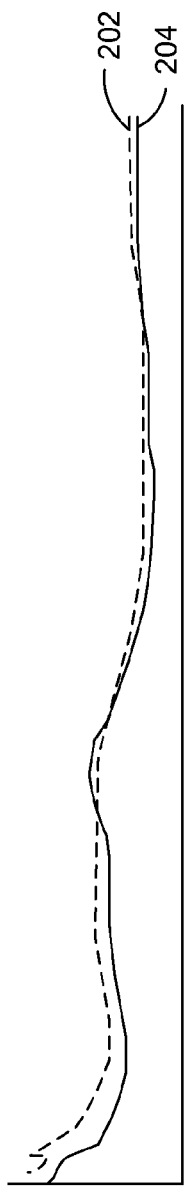
FIGS. 2 A-D shows graphs illustrating an ammonia slip condition.

In FIG. 2A, an example feedgas signal 202 is shown dashed and an example tailpipe signal 204 is shown solid. When exhaust system 128 is in a state of NOx slip, for example, when the SCR is not saturated and $NH_3$ is not being released into the exhaust system, the tailpipe signal may generally be proportional to the feedgas signal. As such, the feedgas NOx signal and tailpipe NOx signal may be in phase and follow each other closely. Furthermore, when the NOx conversion efficiency is substantially zero, tailpipe signal 204 and feedgas signal 202 may be substantially identical. Conversely, for higher NOx conversion efficiencies, the shape of tailpipe signal 204 may resemble the shape of feedgas signal 202 but be a scaled down version of the feedgas signal. Alternatively, when exhaust system 128 is in a state of $NH_3$ slip, tailpipe signal 204 may have a somewhat flattened appearance or undulate at a lower frequency than feedgas signal 202. Because of this, during $NH_3$ slip there is usually a period of time where the two signals are out of phase. Although the tailpipe signal can exceed the feedgas signal, particularly after an increase in temperature, this generally happens during transient or changing conditions, which allows $NH_3$ slip to be identified from the two signals by the method described herein.

Figure 2B:

The method relies on a transient response of the NOx sensors in order to allocate signal to $NH_3$ and NOx. Therefore, a central feature of the method is the rate of change of the NOx signal as a function of time, or d(NOx)/dt. FIG. 2B shows a derivative plot wherein the slope or rate of change of tailpipe signal 204 in FIG. 2A is plotted versus time. Transient $NH_3$ detection is built around a comparison of the actual tailpipe NOx slope detected to the predicted tailpipe NOx slope expected. As such, FIG. 2B includes actual slope 210 that represents the rate of change of the tailpipe signal 204 from FIG. 2A. Actual slope 210 is shown in four parts labeled a-d for reasons that will be described in more detail below. The method further includes predicting a tailpipe NOx slope using the slope of the feedgas NOx (from feedgas signal 202 in FIG. 2A) and the current tailpipe NOx signal, or an instantaneous reading from the tailpipe sensor. The predicted slope 212 for tailpipe NOx sensor, for example, sensor 158 in FIG. 1, can be generated using a known relationship. Herein, the tailpipe NOx slope is predicted using:

$$(dTP_{NOx}/dt)_{exp} = (TP/FG) * (dFG_{NOx}/dt)_{act},$$

where $(dTP_{NOx}/dt)_{exp}$ is the expected or predicted rate of change of the tailpipe signal, TP is an instantaneous tailpipe reading, FG is an instantaneous feedgas reading, and $(dFG_{NOx}/dt)_{act}$ is the actual rate of change of the feedgas signal. Using this method, a comparison of the two slope signals based on the transient responses of the NOx sensors allows a high level of $NH_3$ detection sensitivity. For example, in some embodiments, the transient detection method can detect $NH_3$ levels as low as 25 ppm.

To gauge how close actual slope 210 is to predicted slope 212 during operation, in other words, how the change in NOx signal detected corresponds to the change expected from feedgas signals and system efficiencies, the ammonia slip detection (ASD) method described includes generating an envelope around the predicted slope curve. The envelope defines a region around the predicted rate of change where the NOx output signal is likely to fall when the system is in NOx slip. Therefore, FIG. 2B shows two dash-dot lines that represent a positive envelope 214 offset from the predicted slope in the positive direction and negative envelope 216 offset from the predicted slope in the negative direction. When taken together, both the positive and negative envelopes define a region around the predicted rate of change curve that allows for signal discrimination and assessment of the NOx and $NH_3$ levels in the exhaust system.

Returning to actual slope 210 that is shown in four parts labeled a-d. The different regions of the curve signify time periods when entry conditions are met such that a comparison between the two slope curves can be expected to provide accurate determinations of the NOx and $NH_3$ levels in the exhaust system. For example, sensors 126 and 158 within exhaust system 128 are coupled to controller 12 that may include non-transitory, computer readable data representing instructions executable by processor 102 for enabling and disabling the method based on operating conditions of the engine. Therefore, curves 210a and 210c are shown as unbolded, dashed line segments to represent exemplary periods where entry conditions are not met and the method is disabled. Conversely, curves 210b and 210d are shown as bold, dashed line segments to represent exemplary periods where entry conditions are met and the method is enabled. When engaged, a controller processes the data by comparing actual slope 210 to predicted slope 212 and the surrounding envelope. Basically, when actual slope 210 falls within the envelope, a window counter ramps negative and is decremented toward zero to indicate the exhaust system is comprised of NOx whereas when actual slope 210 falls outside of the envelope, the window counter ramps positive and is incremented toward an upper level away from zero to indicate the presence of $NH_3$ slip in the exhaust system.

In some embodiments, during conditions of $NH_3$ slip the exhaust system may include a tailpipe NOx sensor signal comprised of lower frequency content relative to the feedgas signal. Because of this, an upper level tailpipe frequency may be indicative of $NH_3$ slip. Therefore, when actual slope 210 is greater than a frequency threshold, high frequency content may be indicated that is interpreted as a NOx signal. In response, the window counter may be decremented toward zero to indicate NOx slip regardless of whether the slope falls inside or outside of the envelope. For example, in some embodiments, a rate of change, $(dTP_{NOx}/dt)_{actual}$ (actual slope 210 in FIG. 2B), greater than a maximum allowed rate may be treated as a NOx response by the system.

Figure 2C:
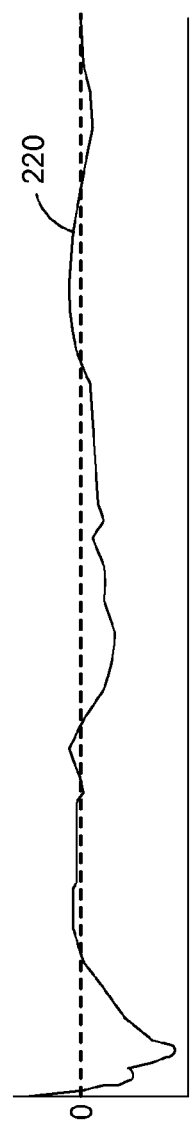

In FIG. 2C, difference plot 220 is shown that reflects the relative difference between actual slope 210 and predicted slope 212 from FIG. 2B. For clarity, a horizontal line at y=0 that indicates no difference, is also shown. Therein, the fluctuations of the actual slope relative to the predicted slope may be more clearly observed. For example, at early times on the left a negative peak is observed that reflects a lower actual slope than was predicted by the method (e.g. actual slope 210 is less than predicted slope 212). Thereafter, following the contour of the difference plot, the actual slope fluctuates around the predicted slope based on conditions in the exhaust system. Although not shown, in some embodiments, other horizontal threshold lines may also be included to further indicate places where differences between the two plots are substantially large.

Figure 2D:
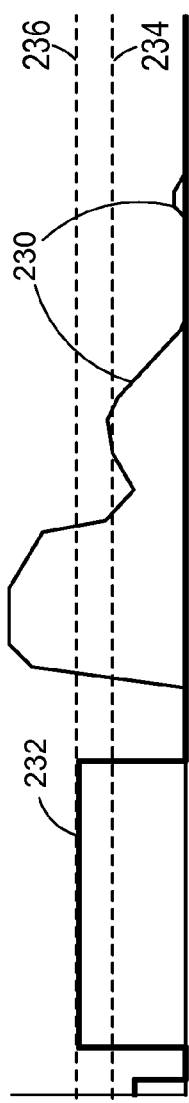

Turning to FIG. 2D, a plot of the window counter that is used for indicating $NH_3$ slip is shown. As described briefly above, when the ASD system is enabled by controller 12, the window counter increments toward an upper level that indicates $NH_3$ slip when actual slope 210 falls outside of the envelope, and decrements toward a lower level that indicates NOx slip when actual slope 210 falls within the envelope. Therefore, window counter 230 is shown increasing when actual slope 210b falls outside of the envelope. In FIG. 2D, two thresholds are shown. First threshold 236 indicates $NH_3$ slip in the exhaust system. As such, when the window counter exceeds first threshold 236, an $NH_3$ flag is set to indicate that $NH_3$ is slipping from the SCR. For simplicity, in this example method, the $NH_3$ flag is a binary flag. Therefore, when window counter 230 is greater than first threshold 236, an $NH_3$ flag is set to 1. Alternatively, when window counter 230 falls below first threshold 236, the $NH_3$ flag is reset to 0. In the example signal processing application shown, the detection system is enabled in the two regions identified at 210b and 210d.During these periods, the counter is active and the controller uses the state of the system to identify whether $NH_3$ slip is occurring or not. In some embodiments, the relative magnitude of window counter 230 compared to first threshold 236 may be used to indicate when exhaust system 128 is slipping $NH_3$ while in other embodiments, the instantaneous location of window counter 230 relative to an upper level (indicating $NH_3$) and a lower level (e.g. 0 indicating NOx) may be used to indicate a probability or degree of $NH_3$ slip in the exhaust system. In still other embodiments, a second threshold 234 may be included that is lower than first threshold 236. When second threshold 234 is present, the $NH_3$ flag may be reset to 0 when window counter 230 falls below second threshold 234 instead of first threshold 236, as was described above. Different thresholds allow for hysteresis in the system so the $NH_3$ flag is not reset to indicate NOx if window counter 230 falls briefly below first threshold 236. Rather, NOx is indicated when window counter 230 falls below the lower threshold that is set to indicate a higher degree of NOx slip in the exhaust system.

Because the ammonia slip detection system is under the control of controller 12, instructions for disabling the detection system may be included in the programmable software stored by the control system. Although the detection system can be disabled based on many conceivable operating conditions, and many combinations of variables are possible, in one embodiment, the programmable instructions may implement the following conditions to disable the detection system: a low SCR temperature, high feedgas NOx levels indicating a saturated feedgas sensor output, high tailpipe NOx levels indicating a saturated tailpipe sensor output, low feedgas or tailpipe NOx levels below a detection threshold, high or low rates of change in the NOx conversion efficiency, low torque output by the engine system, low injection pulses of urea from a storage reservoir, a calibrateable delay after a feedgas sensor or tailpipe sensor becomes activate, a high rate of change of space velocity, a low exhaust flow, a minimum/maximum actual or predicted slope indicating a deadzone in the detected signal, and a low rate of change of feedgas NOx that identifies feedgas inflection points. In response to detection of one or more of these conditions by controller 12, the ASD method may be disabled so no processing of the signal occurs in the manner described herein. For example, actual slope 210c refers to a slope signal acquired during a period when the detection system is disabled. As another example, line 232 is a binary line indicating the disable state of the system. Therefore, when line 232 is substantially on the x-axis, the ASD system is enabled and controller 12 may monitor the exhaust conditions in the manner already described. Conversely, when line 232 is above the x-axis, the ASD system may be disabled so no signal processing occurs. As such, further processing of the tailpipe NOx signal is substantially prohibited since the information obtained may not reliably express NOx and $NH_3$ levels within the exhaust system. During periods where the detection system is disabled, the control system may still monitor conditions within the exhaust system and further have the flexibility to activate the detection system, which in some instances, may involve overriding the disabling software or conditions identified therein.

Figure 3:
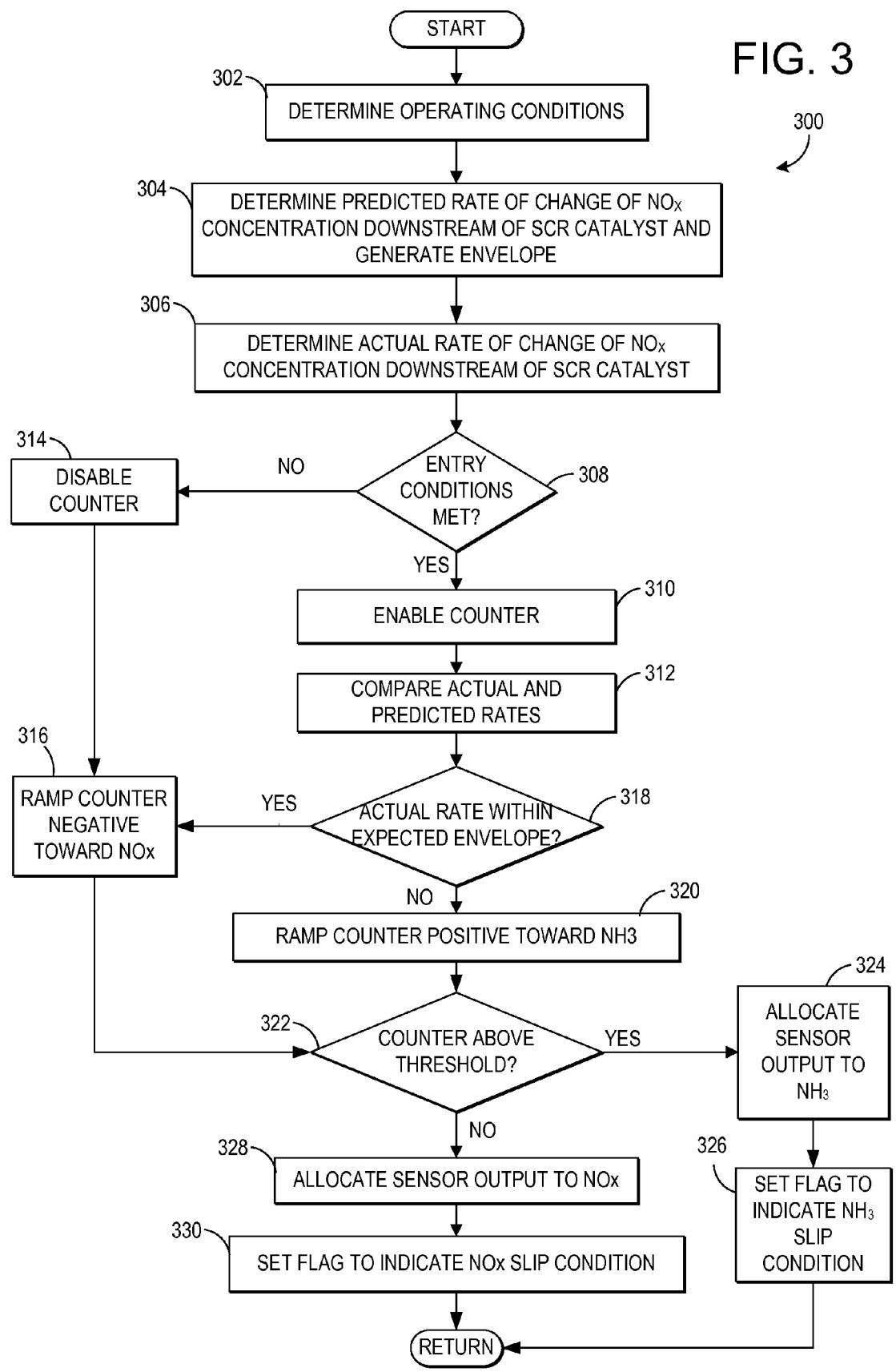
FIG. 3 shows a flow chart illustrating a routine for detecting ammonia slip in an exhaust gas treatment system.

Turning to the method for processing NOx signals by the control system, in FIG. 3, a flow chart illustrating example method 300 for the detection of ammonia slip in an exhaust gas treatment system is shown. Therein, the set of programmable decisions a controller may utilize when allocating a NOx sensor signal to either NOx or $NH_3$, or a combination thereof, is described.

At 302, method 300 includes determining the engine operating conditions. The operating conditions may include both engine operating conditions (e.g., engine speed, engine load, amount of EGR, air fuel ratio, etc.) and exhaust gas treatment system conditions (e.g., exhaust temperature, SCR catalyst temperature, amount of urea injection, etc.).

At 304, method 300 includes determining a predicted rate of change of the tailpipe NOx sensor and generating an envelope based on the expected slope. As described above, the rate of change of the tailpipe NOx sensor may be predicted using the feedgas NOx sensor signal output and a current measure of the tailpipe NOx sensor signal output. Then, based on the rate of change of the tailpipe NOx sensor predicted, the method may further generate the envelope to define a region wherein the signal may be expected to fall when the exhaust system is operating in conditions of NOx slip. Although many methods can be conceived of to generate an envelope, in some embodiments, the envelope is simply a percentage of the predicted slope that is offset from the predicted slope in the positive and negative directions. For example, a controller that defines a region within 5% of a predicted slope of 10.0 may generate a positive envelope with a value of 10.5 and a negative envelope with a value of 9.5. Alternatively, if the predicted slope is smaller, e.g. 1.0, the positive envelope may have a value of 1.05 and the negative envelope may have a value of 0.95. In this way, the envelope will define a region surrounding the predicted curve that is within 5% of the curve. Returning to the envelope of FIG. 2B, the size of the region defined by the envelope clearly deviates as the magnitude of the slope of the predicted curve fluctuates around zero. At 306, method 300 includes determining the actual rate of change of the tailpipe NOx sensor.

Although method 300 may monitor NOx sensors frequently, or even continuously, controller 12 may also enable or disable the system in the manner already described with respect to FIG. 2B. As such, at 308 method 300 includes determining whether the entry conditions have been met. If controller 12 determines that the entry conditions allow for accurate measurements to be made by the detection system, for instance because the temperature of the SCR is above a threshold, then the ASD system may be activated. Therefore, at 310, the activated system includes enabling the window counter in order to compare the actual slope to the predicted slope, as indicated at 312. Alternatively, if controller 12 determines that an accurate measurement by the NOx system is not possible based on conditions detected in the engine system, at 314, the control system may disable the counter so no further signal processing occurs after signal acquisition. In some embodiments, when the ASD system is disabled, the counter may be reset by ramping the counter negative to indicate NOx slip by the system. In other embodiments, the counter may not be ramped in the manner described above, but simply hold a value until the detection system is reactivated.

Returning to 312, wherein controller 12 has determined that the entry conditions have been met and the detection system is activated to allow adjustment of a counter based on a comparison between the actual and predicted NOx rates, once the comparison is made, at 318 the controller may be programmed to determine whether the actual slope falls within the envelope. Then, based on a location of the actual slope relative to the envelope, a positive or negative score may be assigned based on the relative differences. As described in more detail above with respect to FIG. 2D, at 320 the counter is ramped positive toward an upper level that indicates $NH_3$ slip when the actual slope falls outside of the envelope whereas at 316 the counter is ramped negative toward a lower level (e.g. zero) indicating NOx slip when the measured rate falls within the envelope.

After ramping the counter based on the relative location of the actual slope compared to the envelope surrounding the predicted rate of change, at 322 method 300 further compares the counter to a threshold to determine whether the tailpipe NOx sensor is to be allocated to NOx or $NH_3$. In one embodiment, sensor allocation includes allocating a first portion of the NOx sensor output to NOx and a second, remaining portion of the NOx sensor output to ammonia. Then, based on the allocation, delivering reductant to the engine exhaust based on each of the first and second portions. For example, reductant can be increased responsive to increased NOx but decreased responsive to increased $NH_3$. Therefore, the amount of reductant injected generally depends on the relative amounts indicated by the first and the second portions.

If the counter is above the first threshold, for example first threshold 236 in FIG. 2D, at 324 controller 12 may allocate at least some of the tailpipe output signal to $NH_3$ slip and set a flag to indicate such at 326. Alternatively, if controller 12 determines that the counter falls below the first threshold, at 328 it may allocate at least some of the tailpipe output signal to NOx slip and set a flag to indicate such at 330. In some embodiments, the current status of the sensor allocation may correspond to a probability of $NH_3$ slip while in other embodiments, $NH_3$ slip may be indicated by a binary flag. In this manner, controller 12 can detect ammonia slip within the exhaust system and allocate the NOx sensor output to either one or both of NOx and $NH_3$ while communicating the current status to a driver and adjusting one or more operating parameters based on the sensor output.

Figure 4:
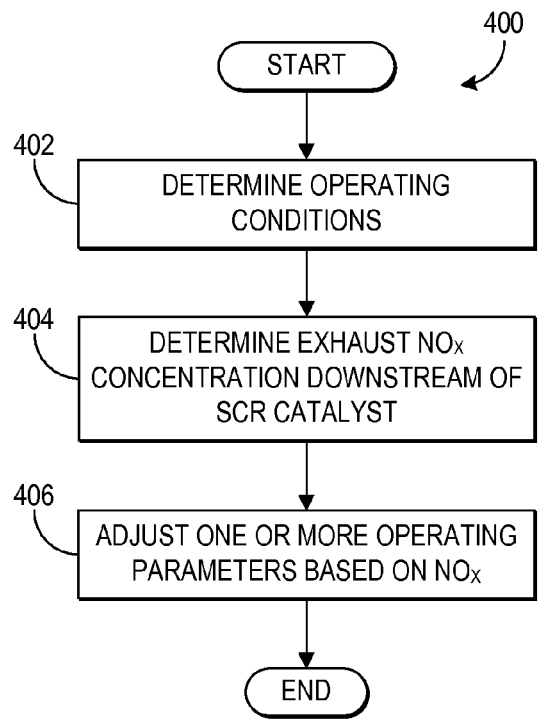
FIG. 4 shows a flow chart illustrating a routine for controlling operating parameters when an exhaust gas sensor output is allocated to nitrogen oxide.

Continuing to FIG. 4, a routine for adjusting system operation based on the allocation of sensor output to $NO_x$ is shown. Specifically, the routine determines an exhaust $NO_x$ concentration downstream of the SCR catalyst and adjusts one or more operating parameters based on the sensor output.

At 402, operating conditions are determined. As described above, the operating conditions may include engine operating conditions (e.g., engine speed, engine load, amount of EGR, air fuel ratio, etc.) and exhaust gas treatment system conditions (e.g., exhaust temperature, SCR catalyst temperature, amount of urea injection, etc.).

Once the operating conditions are determined, the routine proceeds to 404 and the exhaust $NO_x$ concentration downstream of the SCR catalyst is determined based on the exhaust gas sensor output.

At 406, one or more operating parameters are adjusted based on the $NO_x$ concentration. As non-limiting examples, the operating parameters may include amount of EGR and amount of urea injection, or dosing level, wherein the urea dosing level may be adjusted until an actual NOx efficiency matches a predicted NOx efficiency. For example, the amount of EGR may be increased by an amount corresponding to the change in $NO_x$ amount above the threshold amount. By increasing the amount of EGR, less $NO_x$ may be emitted by the engine resulting in a reduced amount of $NO_x$ passing through the SCR catalyst. As another example, the amount of urea injection may be increased by an amount corresponding to the change in $NO_x$ amount above the threshold amount and a temperature of the SCR catalyst. The amount of urea injection may be increased by changing the pulsewidth or duration of the urea injection, for example. By increasing the amount of urea injected to the SCR catalyst, a greater amount of $NO_x$ may be reduced by the catalyst, thereby reducing the amount of $NO_x$ which passes through the catalyst. In other examples, a combination of amount of EGR and amount of urea injection may be adjusted.

Figure 5:
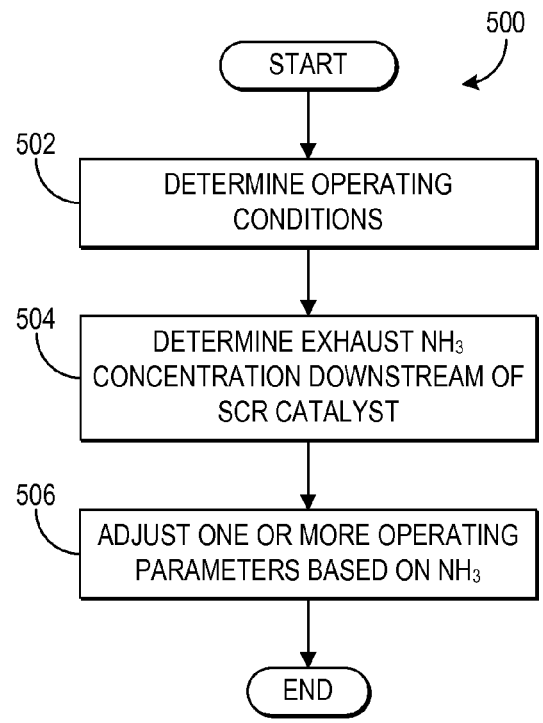
FIG. 5 shows a flow chart illustrating a routine for controlling operating parameters when an exhaust gas sensor output is allocated to ammonia.

In FIG. 5, a routine for adjusting system operation based on the allocation of sensor output to $NH_3$ is shown. Specifically, the routine determines an exhaust $NH_3$ concentration downstream of the SCR catalyst and adjusts one or more operating parameters based on the sensor output.

At 502, operating conditions are determined. As described above, the operating conditions may include engine operating conditions (e.g., engine speed, engine load, amount of EGR, air fuel ratio, etc.) and exhaust gas treatment system conditions (e.g., exhaust temperature, SCR catalyst temperature, amount of urea injection, etc.).

Once the operating parameters are determined, the routine continues to 504 and the exhaust $NH_3$ concentration downstream of the SCR catalyst is determined based on the exhaust sensor output.

At 506, one or more operating parameters are adjusted based on the $NH_3$ concentration. As non-limiting examples, the operating parameters may include amount of urea injection and amount of EGR. For example, the amount of urea injection may be reduced such that an amount of excess $NH_3$ which slips from the SCR catalyst is reduced. As described above, the amount of urea injection may be increased by changing the pulsewidth or duration of the urea injection. As another example, the amount of EGR may be reduced. For example, by reducing the amount of EGR, a greater amount of $NO_x$ may be emitted from the engine. The increased $NO_x$ may be reduced by the excess $NH_3$ in the SCR catalyst, thereby reducing the amount of $NO_x$ which passes through the SCR catalyst.

With regard to urea dosing, in one embodiment, the exhaust system may be an adaptive SCR system that achieves the proper adaptive value by adjusting the urea dosing level until the actual NOx efficiency matches the predicted NOx efficiency. For example, as tailpipe NOx levels increase, the calculated NOx efficiency decreases. If the efficiency drops too low, the adaptive system responds by increasing urea dosing to achieve the predicted NOx efficiency. Conversely, as $NH_3$ levels increase, the calculated efficiency also decreases since $NH_3$ looks like NOx to a NOx sensor. As such, the adaptive system responds by decreasing urea dosing to achieve the predicted efficiency. Because the adaptive correction is different for NOx versus $NH_3$ slip, the control system may depend on allocation of a NOx sensor output to NOx and $NH_3$ by the methods described herein.

The amount the operating parameters are adjusted may be further based on a temperature of the SCR catalyst, as the point of urea saturation of the catalyst varies with temperature. For example, when the temperature of the catalyst is a relatively higher temperature, the amount of EGR may be reduced less and/or the amount of urea injection may be reduced by a smaller amount. In contrast, when the temperature of the catalyst is a relatively lower temperature, the amount of EGR may be increased more and/or the amount of urea injection may be reduced by a larger amount.

In other examples, only the amount of EGR may be decreased or only the amount of urea injected to the SCR catalyst may be increased. In still other examples, one or more other operating parameters may be additionally or alternatively adjusted. As such, one or more operating parameters are adjusted in order to reduce the $NH_3$ slip.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
   allocating a NOx sensor output to each of $NH_3$ and NOx based on calculating upstream and downstream NOx rates of change relative to an SCR emission device,
   determining an expected downstream NOx rate of change,
   generating an envelope surrounding the expected downstream NOx rate of change, and
   comparing the calculated downstream NOx rate of change to the expected downstream NOx rate of change and the envelope surrounding the expected downstream NOx rate of change, where the expected downstream NOx rate of change is determined based on the calculated upstream rate of change; and
   adjusting reductant delivery into engine exhaust via an injector based on the allocation.

2. The method of claim 1 wherein more of the NOx sensor output is allocated to NOx than $NH_3$ when the calculated downstream NOx rate of change is within the envelope.

3. The method of claim 1 wherein a first portion of the NOx sensor output is allocated to NOx and a second, remaining portion of the NOx sensor output to $NH_3$, wherein reductant delivery is based on each of the first and second portions, with different adjustments for the first portion as compared to the second portion.

4. The method of claim 1 wherein a portion of the NOx sensor output is allocated to $NH_3$ when the calculated downstream NOx rate of change is outside of the envelope.

5. The method of claim 1 wherein the upstream NOx rate of change is determined based on a sensor.

6. The method of claim 1 wherein the allocating is further based on a counter that quantifies the comparison of the calculated downstream NOx rate of change and the envelope.

7. The method of claim 6 wherein the counter ramps negative to a lower level that indicates NOx slip when the calculated downstream NOx rate of change is within the envelope and ramps positive to an upper level that indicates $NH_3$ slip when the calculated downstream NOx rate of change is outside of the envelope.

8. The method of claim 7 wherein the allocation is based on the counter relative to the lower level and upper level.

9. The method of claim 8 wherein an additional operating parameter is adjusted based on the allocation.

10. A method for performing real-time control of ammonia slip in an engine exhaust system, comprising:
    allocating an output of a NOx sensor arranged downstream of an SCR emission device to each of $NH_3$ and NOx based on:
    predicting a a rate of change of NOx downstream of the SCR emission device,
    generating an envelope that surrounds the predicted rate of change, and
    comparing an actual rate of change of NOx downstream of the SCR emission device to the predicted rate of change and the envelope, the actual rate of change based on the output from the NOx sensor downstream of the SCR emission device; and
    adjusting delivery of a reductant to engine exhaust upstream of the SCR emission device via an injector based on the allocation.

11. The method of claim 10 further comprising, if the actual rate of change is outside of the envelope surrounding the predicted slope, determining there is an $NH_3$ slip condition.

12. The method of claim 11 wherein the predicted rate of change is based on an upstream NOx rate of change.

13. The method of claim 12 wherein the predicted rate of change is further based on a current output of the NOx sensor arranged downstream of the SCR emission device and a current output of a NOx sensor arranged upstream of the SCR emission device.

14. The method of claim 10 wherein the allocation is further based on a counter that quantifies the comparison of the actual rate of change and the predicted rate of change.

15. The method of claim 10 wherein the envelope surrounding the predicted rate of change is comprised of a positive envelope offset from the predicted rate of change in a positive direction, and a negative envelope offset from the predicted rate of change in a negative direction.

16. A system, comprising:
    an engine with an exhaust system;
    an exhaust treatment system disposed in the exhaust system and including an SCR emission device, a urea injector disposed upstream of the SCR emission device, a NOx sensor disposed downstream of the SCR emission device, and a NOx sensor disposed upstream of the SCR emission device; and
    a control system in communication with the exhaust treatment system, where the control system includes non-transitory instructions for $NH_3$ slip detection based on a transient NOx signal, wherein the $NH_3$ slip detection includes:
    allocating an output of the NOx sensor disposed downstream of the SCR emission device to each of $NH_3$ and NOx and
    adjusting injection of reductant via the urea injector to engine exhaust gas upstream of the SCR emission device based on the allocation, where the allocation is based on:
    a comparison of an envelope which surrounds an expected rate of change of NOx downstream of the SCR emission device and a calculated rate of change of NOx downstream of the SCR emission device,
    wherein if the calculated rate of change of NOx downstream of the SCR emission device is within the envelope, determining there is a NOx slip condition.

* * * * *